United States Patent
Bendler et al.

(10) Patent No.: US 11,142,628 B2
(45) Date of Patent: Oct. 12, 2021

(54) PLASTICIZERS POLYAMIDE COMPOSITIONS

(71) Applicant: E I DU PONT DE NEMOURS AND COMPANY, Wilmington, DE (US)

(72) Inventors: Herbert Vernon Bendler, Wilmington, DE (US); Hari Babu Sunkara, Hockessin, DE (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 0 days.

(21) Appl. No.: 16/375,463

(22) Filed: Apr. 4, 2019

(65) Prior Publication Data

US 2019/0233615 A1     Aug. 1, 2019

Related U.S. Application Data

(63) Continuation of application No. 15/116,758, filed as application No. PCT/US2015/016578 on Feb. 19, 2015, now abandoned.

(60) Provisional application No. 61/943,685, filed on Feb. 24, 2014.

(51) Int. Cl.
| | |
|---|---|
| *C08K 5/06* | (2006.01) |
| *C08L 77/02* | (2006.01) |
| *C08L 77/06* | (2006.01) |
| *C08K 5/103* | (2006.01) |

(52) U.S. Cl.
CPC ............... *C08K 5/06* (2013.01); *C08K 5/103* (2013.01); *C08L 77/02* (2013.01); *C08L 77/06* (2013.01)

(58) Field of Classification Search
CPC ........... C08K 5/06; C08K 5/103; C08L 77/02; C08L 77/06
See application file for complete search history.

(56) References Cited

U.S. PATENT DOCUMENTS

| | | |
|---|---|---|
| 3,264,272 A | 8/1966 | Watkin |
| 4,174,358 A | 11/1979 | Epstein |
| 4,745,143 A | 5/1988 | Mason et al. |
| 4,801,633 A | 1/1989 | Mason et al. |
| 5,741,370 A | 4/1998 | Hanoka |
| 5,821,092 A | 10/1998 | Nagarajan et al. |
| 5,866,658 A | 2/1999 | Talkowski |
| 6,399,684 B1 | 6/2002 | Talkowski |
| 6,680,082 B2 | 1/2004 | Chou et al. |
| 6,756,443 B2 | 6/2004 | Feinberg |
| 6,913,043 B2 | 7/2005 | Jacques et al. |
| 7,144,938 B1 | 12/2006 | Feinberg et al. |
| 7,592,056 B2 | 9/2009 | Reynoso Gomez |
| 7,919,658 B2 | 4/2011 | Adkesson et al. |
| 8,586,663 B2 | 11/2013 | Hausmann et al. |
| 8,759,559 B2 | 6/2014 | Sunkara et al. |
| 8,759,565 B2 | 6/2014 | Sunkara et al. |
| 8,884,073 B2 | 11/2014 | Muliawan et al. |
| 2004/0058111 A1 | 3/2004 | Manas-Zloczower et al. |
| 2005/0020762 A1 | 1/2005 | Chou et al. |
| 2005/0203253 A1 | 9/2005 | Chou et al. |
| 2006/0142489 A1 | 6/2006 | Chou et al. |
| 2009/0281220 A1* | 11/2009 | Fenyvesi ................ C08K 5/103 524/317 |
| 2011/0020573 A1 | 1/2011 | Chou et al. |
| 2011/0052848 A1 | 3/2011 | Doshi et al. |
| 2011/0071258 A1 | 3/2011 | Uradnisheck |

FOREIGN PATENT DOCUMENTS

| | | |
|---|---|---|
| JP | 2008-174619 A | 7/2008 |
| KR | 10-2011-0013451 A | 2/2011 |
| KR | 10-2012-0037496 A | 4/2012 |
| WO | 2004/052993 A1 | 6/2004 |
| WO | 2007/041722 A1 | 4/2007 |
| WO | 2007/041723 A1 | 4/2007 |
| WO | 2015/023714 A2 | 2/2015 |

OTHER PUBLICATIONS

Dunn et al., The Stress Cracking of Polyamides by Metal Salts. Part 1 Metal Halides, Journ. of Applied Polymer Science, vol. 13, pp. 1641-1655 (1969).
PCT International Search Report for Application No. PCT/US2015/016578, Vilz Brigitte, Examiner, ISA/EPO; dated Apr. 30, 2015.
Wygoski et al., "Stress Cracking of Nylon Polymers in Aquenous Salt Solutions", Part 2, Journ. of Materials Science, vol. 22, pp. 1715-1723 (1987).
Wyzgoski et al., "Stress Cracking of Nylon Polymers in Aqueous Salt Solutions", Journ. of Materials Science, vol. 22, pp. 1707-1714 (1987).

* cited by examiner

*Primary Examiner* — Edward J Cain

(57) ABSTRACT

Plasticized compositions comprising polyamide or polyamide/ionomer blend and poly(trimethylene ether) glycol are provided. Also articles prepared from these compositions are provided.

12 Claims, No Drawings

PLASTICIZERS POLYAMIDE COMPOSITIONS

FIELD OF THE INVENTION

The invention relates to plasticized compositions comprising polyamide or polyamide/ionomer blend and poly(trimethylene ether) glycol, and to articles prepared from the compositions.

DESCRIPTION OF PRIOR ART

Polyamides (nylons) are widely used in many industrial applications. Through modification, properties of polyamides can be tailored for the intended performance. For automotive vehicular applications, polyamides are used for tubing, hoses and cable jackets. Those applications require high flexibility, which is generally attained by adding plasticizer to the polyamides. Also, automotive applications for polyamides require resistance to metal salts, especially chloride salts.

Depending on the chemical nature of the polyamides, exposure to inorganic salt solutions has been known to cause stress cracking of polyamides ("salt stress cracking", see "Stress Cracking of Nylon Polymers in Aqueous Salt Solutions Part 1 Stress-rupture behaviour," M. G. Wyzgoski and G. E. Novak, *Journal of Material Science*, 1987, 1707-1714). Dunn and Sansom classified metal halides according to their ability to induce salt stress cracking ("The Stress Cracking of Polyamides by Metal Salts. Part 1. Metal Halides," P. Dunn and G. F. Sansom, *Journal of Applied Polymer Science*, 1969, 13, 1641-1655). Zinc chloride was classified as a Type I salt, characterized as an extremely aggressive cracking agent for polyamides even at room temperature. Calcium chloride is milder in causing stress cracking and was classified as a Type II salt.

Polyamides with a higher ratio of methylene groups to amide (NHC=O), such as nylon-11 and nylon-12, have low susceptibility to salt stress cracking when exposed to chloride metal salt solutions such as $ZnCl_2$ solution. On the other hand, polyamides with a lower ratio of methylene groups to amide, such as nylon-6 and nylon-66, are highly susceptible to cracking, with nylon-6 more susceptible than nylon-66 ("Stress Cracking of Nylon Polymers in Aqueous Salt Solutions Part 2 Nylon Salt interactions," M. G. Wyzgoski and G. E. Novak, *Journal of Material Science*, 1987, 1715-1723).

Accordingly, plasticized nylon-11 and nylon-12 with excellent salt stress crack resistance and low water absorption have been used for automotive applications. Products based on nylon-11 and nylon-12 are expensive because of the high cost of those polymers. Also, they have lower melting temperature and may be unsuited for use at temperatures such as above 95° C. Poor salt resistance and high water absorption are main barriers for lower cost nylon-6 and nylon-66 to be used in automotive applications. The presence of plasticizer in such polyamides makes them even more susceptible to salt stress cracking. Thus, highly flexible nylon-66 or nylon-6 modified with plasticizer has limited industrial application due to its poor resistance to salt stress cracking and high water uptake.

Nylon-6/12 and -6/10 are also attractive alternatives to nylon-11 or -12 because of their lower cost and higher use temperature. Still, insufficient zinc chloride salt resistance is often one of the obstacles preventing nylon-6/12 and -6/10 based compositions from penetrating into auto tubing/hose applications. For example, nylon-6/12 may survive $ZnCl_2$ tests at room temperature, but fails at higher temperatures, such as 50° C.

It is desirable to form hoses having the zinc chloride resistance properties of nylon-11 or -12 while providing the cost and structural advantages of nylon-6, nylon-6/10 or nylon-6/12.

U.S. Patent Application Publication 2004/0058111 discloses compounded nylon-6, nylon-12 material for air brake systems with resistance to degradation by zinc chloride and moisture.

U.S. Patent Application Publication 2011/0052848 discloses polyamides made from 1,6-hexanediamine, and the dicarboxylic acids 1,10-decandioic acid, 1,12-dodecanedioic acid, or 1,14-tetradecanedioic acid and terephthalic acid in specified proportions that are particularly resistant to salt stressed (induced) corrosion cracking.

U.S. Pat. Nos. 4,745,143 and 4,801,633 disclose blends of polyamides, including nylon-6, with a water insoluble plasticizer and ionomers with improved $CaCl_2$ stress cracking resistance.

Ionomers are ethylene acid copolymers in which at least a portion of the carboxylic acid groups in the copolymer are neutralized to salts containing metal ions. U.S. Pat. No. 3,264,272 discloses a composition comprising a random copolymer of copolymerized units of an alpha-olefin having from two to ten carbon atoms, an alpha, beta-ethylenically-unsaturated carboxylic acid having from three to eight carbon atoms in which 10 to 90 percent of the acid groups are neutralized with metal ions, and an optional third mono-ethylenically unsaturated comonomer such as methyl methacrylate or ethyl acrylate.

It is known that thermoplastic blends based on ionomers and polyamides have a combination of desirable properties (see U.S. Pat. Nos. 4,174,358, 5,866,658, 6,399,684, 6,756,443 and 7,144,938). For example, U.S. Pat. No. 5,866,658 discloses a blend of an ionomer dispersed in a continuous or co-continuous polyamide phase in the range of 60/40 weight % to 40/60 weight % used for molded parts exhibiting toughness, high gloss, abrasion/scratch resistance, and high temperature properties.

The ionomers include zinc ionomers or ionomers with mixtures of zinc and magnesium cations, which have a neutralization of 65 to 100 mole percent of the acid groups. A higher degree of neutralization, however, may cause unacceptably high melt viscosity. To address the high melt viscosity of the blends of nylon and ionomer, one may use nylon of lower molecular weight and/or incorporate melt flow additives. For example, U.S. Pat. No. 6,756,443, "Ionomer/Polyamide Blends with Improved Flow and Impact Properties", discloses an ionomer/polyamide blend with improved flow (e.g., lower melt viscosity) by incorporating a low molecular weight ethylene/acrylic acid copolymer (acid wax). The method adds complexity and also inevitably compromises properties. U.S. Pat. No. 7,144,938 discloses similar blends also containing one or more esters of montanic acid.

U.S. Patent Application Publications 2005/0203253A1, 2005/020762A1, and 2006/0142489A1 disclose polyamides toughened with ionomers of ethylene copolymers containing a monocarboxylic acid and a dicarboxylic acid or derivative thereof. U.S. Patent Application Publication 2011/0020573 discloses a blend comprising a polyamide, an ionomer of an ethylene copolymer containing a monocarboxylic acid and a dicarboxylic acid or derivative thereof, and a sulfonamide. Examples therein have excellent $ZnCl_2$ stress crack resistance, but also have high melt viscosity.

U.S. Pat. No. 8,586,663 discloses a blend comprising a polyamide, an ionomer of an ethylene copolymer containing a monocarboxylic acid and a dicarboxylic acid or derivative thereof, and a second ionomer.

U.S. Pat. No. 6,680,082 describes mixed ion ionomers, particularly ionomers with a mixture of zinc and magnesium, calcium, sodium or lithium for metal coating powder applications. U.S. Pat. No. 5,741,370 describes a mixture of sodium ionomer and zinc ionomer useful as a material for a solar module backskin. U.S. Pat. No. 7,592,056 discloses blends of polyamides with ionomers, including blends with mixtures of zinc and sodium ionomers.

It is desirable to develop highly flexible polyamides with environmentally friendly additives having high toughness, high abrasion and scratch resistance, excellent salt stress crack resistance and low water uptake. It is also desirable that such compositions make use of more readily available polyamides such as nylon-6 nylon-66, nylon-6/10 or nylon-6/12, which have much lower cost.

SUMMARY OF THE INVENTION

One aspect of the present invention is a flexible polymer composition comprising a polyamide base polymer and plasticizer, wherein the plasticizer comprises an effective amount of poly(trimethylene ether) glycol (PPD), wherein the polyamide base polymer is an aliphatic polyamide, a semi-aromatic polyamide, or a mixture thereof.

One another aspect of the present invention is a flexible polymer composition comprising a polyamide base polymer and plasticizer, wherein the plasticizer comprises a mixture of poly(trimethylene ether) glycol (PPD) and poly(trimethylene ether) glycol benzoate.

Another aspect is an article comprising a flexible polymer composition, wherein the polymer composition comprises a polyamide base polymer and plasticizer, and wherein the plasticizer comprises an effective amount of poly(trimethylene ether) glycol (PPD), further wherein the polyamide base polymer is an aliphatic polyamide, a semi-aromatic polyamide, or a mixture thereof.

DETAILED DESCRIPTION OF THE INVENTION

All references disclosed herein are incorporated by reference.

Unless stated otherwise, all percentages, parts and ratios are by weight. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. When a component is indicated as present in a range having a lower limit of 0, such component is an optional component (i.e., it may or may not be present). Such optional components, when present, are included in an amount preferably of at least about 0.1 weight % of the total weight of the composition or polymer.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that may have become recognized in the art as suitable for a similar purpose.

As used herein, the term "copolymer" refers to polymers comprising copolymerized units resulting from copolymerization of two or more comonomers and may be described with reference to its constituent comonomers or to the amounts of its constituent comonomers such as, for example "a copolymer comprising ethylene and 15 weight % of acrylic acid". Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. However, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

"Sheets" and "films" may be used interchangeably to describe articles wherein the compositions are processed into generally planar forms, either monolayer or multilayer. The processing method and/or the thickness may influence whether the term "sheet" or "film" is used herein, but either term can be used to describe such generally planar articles.

By a "vehicle" is meant any device which moves and transports people and/or freight or performs other functions. The vehicle may be self propelled or not, and may typically move on wheels, tracks, skids and/or runners. Applicable vehicles include automobiles, motorcycles, wheeled construction vehicles, farm or lawn tractors, trucks, trailers, all-terrain vehicles, snowmobiles and the like. Notable vehicles are automobiles, trucks, and motorcycles.

The compositions described herein provide vehicular parts with improved resistance to degradation due to exposure to salt. Such exposure may be typically encountered, for instance, by parts that come into contact with road salt or salt in and around oceans and other bodies of water. In normal operation in these environments vehicular parts, particularly those used in under-the-hood applications, are vulnerable to degradation over prolonged periods of time. Even intermittent exposure to salt over time can have adverse effects.

"In normal operation said part is exposed to salt" means that when tested in a normal vehicle configuration (as supplied by the manufacturer with all OEM guards in place, but no additional equipment present), the part is wet or otherwise exposed to a water solution on its exposed side in the following test. The vehicle is driven (or towed if not self propelling) at 50 km/h (about 30 mph) for 20 meters through a trough (so that all wheels go through the water or water solution) filled with water or a solution of a "marker" in water which is 1.5 cm deep. The part being tested is then checked to see if it is wet on the exposed side. If the part is wet it is considered exposed to salt in normal operation. If the part is normally hot in operation and the water would evaporate quickly, a marker substance is used in the water and part checked for the marker. The marker may be a salt (a white salt deposit will remain) of a chemical such as fluorescein whose presence can be found using ultraviolet light. If the marker chemical is on the part, the part is considered as exposed to salt in normal operation. This test simulates moving on a highway that may be covered with salt particles from melting ice or snow and/or a salt solution, and the resulting saltwater spray which is thrown onto the vehicle.

In developing blends of nylon-6 and ionomers, Zn (zinc) ionomer has been preferred due to the interaction between Zn cations, divalent transition metal cations, and both amide and amine groups of polyamide. This physical interaction enhances the compatibility of the blend. Ionomers with sodium or potassium cations were not preferred in blending with polyamides due to the poor compatibility. Also Na ionomers and K ionomers tend to absorb larger amount of water, and in general have poor UV stability (see for example U.S. Pat. No. 5,866,658). However, adding zinc-only ionomers to nylon-6 does not improve the $ZnCl_2$ salt stress crack resistance.

We have discovered a methodology for enhancing the salt crack resistance for polyamide materials, particularly for those with a lower ratio of methylene to amide groups in the polyamide. We have surprisingly discovered that nylon-6 when plasticized with poly(trimethylene ether glycol)benzoate exhibits unexpectedly excellent salt resistance. In addition said plasticized composition demonstrates a high barrier to moisture vapor and reduced water absorption by the polymer composition, and also good flexibility of the plasticized polymer Polyamides (abbreviated PA), also referred to as nylons, are condensation products of one or more dicarboxylic acids and one or more diamines, and/or one or more aminocarboxylic acids such as 11-aminododecanoic acid, and/or ring-opening polymerization products of one or more cyclic lactams such as caprolactam and laurolactam. Polyamides may be fully aliphatic or semi-aromatic.

Polyamides from single reactants such as lactams or amino acids, referred to as AB type polyamides are disclosed in Nylon Plastics (edited by Melvin L. Kohan, 1973, John Wiley and Sons, Inc.) and include nylon-6, nylon-11, nylon-12. Polyamides prepared from more than one lactam or amino acid include nylon-612.

Other well known polyamides include those prepared from condensation of diamines and diacids, referred to as AABB type polyamides (including nylon-66, nylon-610 and nylon-612), as well as from a combination of lactams, diamines and diacids such as nylon-6/66, nylon-6/610, nylon-6/66/610, nylon-66/610, or combinations of two or more thereof.

Fully aliphatic polyamides used in the resin composition are formed from aliphatic and alicyclic monomers such as diamines, dicarboxylic acids, lactams, aminocarboxylic acids, and their reactive equivalents. In this context, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic dicarboxylic acids, such as for example adipic acid (C6), pimelic acid (C7), suberic acid (C8), azelaic acid (C9), decanedioic acid (010) and dodecanedioic acid (C12). Diamines can be chosen among diamines with four or more carbon atoms, including but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine, trimethylhexamethylenediamine and/or mixtures thereof.

Preferred polyamides disclosed herein are homopolymers or copolymers wherein the term copolymer refers to polyamides that have two or more amide and/or diamide molecular repeat units. The homopolymers and copolymers are identified by their respective repeat units. For copolymers disclosed herein, the repeat units are listed in decreasing order of mole % repeat units present in the copolymer. The following list exemplifies the abbreviations used to identify monomers and repeat units in the homopolymer and copolymer polyamides (PA).

HMD hexamethylene diamine (or 6 when used in combination with a diacid)
AA Adipic acid
6 ε-Caprolactam
TMD 1,4-tetramethylene diamine
66 polymer repeat unit formed from HMD and AA
6 polymer repeat unit formed from ε-caprolactam Note that in the art the term "6" when used alone designates a polymer repeat unit formed from ε-caprolactam. Alternatively "6" when used in combination with a diacid such as adipic acid, the "6" refers to HMD. In repeat units comprising a diamine and diacid, the diamine is designated first. Furthermore, when "6" is used in combination with a diamine, for instance 66, the first "6" refers to the diamine HMD, and the second "6" refers to adipic acid. Likewise, repeat units derived from other amino acids or lactams are designated as single numbers designating the number of carbon atoms.

The advantages of improved salt stress crack resistance are particularly useful for polyamides with a lower ratio of methylene units to amide groups, including those with a ratio of five or less methylene units per amide group, such as nylon-6, nylon-6/66 and most especially nylon-6.

The polyamide component may consist essentially of nylon-6. Nylon-6 is the most commonly used in the industry and has the lowest cost, but has the poorest $ZnCl_2$ resistance, so a method to improve its salt stress crack resistance is particularly desirable.

In other embodiments the polyamide composition comprises nylon-6 with up to 40 weight % of one or more additional polyamides selected from among the following: nylon-6,66, nylon-66, nylon-610, nylon-612, nylon-11 and nylon-12. In these embodiments the additional polyamide may be present in a range from a lower limit of about 0.1, 1.0, 5 or 10 weight % to an upper limit of 10, 20 or 40 weight % of the polyamide component. Replacement of a portion of the nylon-6 with any of these other polyamides that have inherently better metal halide resistance may enhance $ZnCl_2$ resistance compared to a composition with only nylon-6, but would increase cost.

In another embodiment the polyamide consists essentially of nylon-6/12. In other embodiments the polyamide composition comprises nylon-6/12 with up to 40 weight % of one or more additional polyamides selected from among the following: nylon-6,66, nylon-66, nylon-610, nylon-612, nylon-11 and nylon-12. In these embodiments the additional polyamide may be present in a range from a lower limit of about 0.1, 1.0, 5 or 10 weight % to an upper limit of 10, 20 or 40 weight % of the polyamide component.

Most common nylon-6 grades used for molding and extrusion applications are suitable. For example, both Ultramid B33 (extrusion grade from BASF) with a RV of 3.3 and Ultramid B27 (molding grade from BASF) with a RV of 2.7 are suitable. Mixtures of nylon-6 with different RV may be used as the polyamide component. For example, mixtures of 30 to 70 weight % of nylon-6 with RV of around 2.7 with 70 to 30 weight % of nylon-6 with RV around 3.3 may be used.

Salt stress crack resistance may be enhanced when higher RV polyamides are used. Accordingly, the higher RV polyamide is desirably used in at least 50 weight % of the polyamide mixture.

Because polyamides and processes for making them are well known to one skilled in the art, detailed description of their preparation is omitted herein for the interest of brevity.

Suitable ionomers are ethylene acid copolymers comprising in-chain copolymerized units of ethylene and in-chain copolymerized units of an $\alpha,\beta$-unsaturated $C_3$-$C_8$ monocarboxylic acid; at least partially neutralized to salts comprising alkali metal cations such as sodium or lithium, or zinc cations, or a combination of such cations.

The $\alpha,\beta$-unsaturated $C_3$-$C_8$ monocarboxylic acid may be acrylic acid or methacrylic acid, and the monocarboxylic acid may be present in the copolymer in an amount from about 3 to about 20 weight %, or about 12 to about 20 weight %, or about 4 to about 15 weight % of the copolymer.

The ethylene acid copolymer may also optionally include other comonomers such as alkyl acrylates and alkyl methacrylates wherein the alkyl groups have from 1 to 8 carbon atoms such as methyl acrylate, ethyl acrylate and n-butyl acrylate. These comonomers, when present, can be from 0.1 to about 30% based on the total weight of the copolymer, or about 3 to about 25%. The optional alkyl acrylates and alkyl methacrylates provide softer acid copolymers that after neutralization form softer ionomers.

Of note are ethylene acid dipolymers consisting essentially of copolymerized units of ethylene and copolymerized units of monocarboxylic acid (that is, the amount of alkyl acrylate or alkyl methacrylate is 0 weight %), and ionomers thereof. Preferably the monocarboxylic acid is acrylic acid or methacrylic acid.

The acid copolymers may be obtained by high-pressure free radical polymerization, wherein the comonomers are directly copolymerized with ethylene by adding all comonomers simultaneously. This process provides copolymers with "in-chain" copolymerized units derived from the monomers, where the units are incorporated into the polymer backbone or chain. These copolymers are distinct from a graft copolymer, in which the acid comonomers are added to an existing polymer chain via a post-polymerization grafting reaction, often by a free radical reaction.

These copolymers are treated so that at least some of the carboxylic acid groups present are neutralized to form salts with zinc or alkali metal cations to provide ionomers useful in the compositions described herein.

Neutralization of an ethylene acid copolymer can be effected by first making the ethylene acid copolymer and treating the copolymer with basic compound(s) comprising zinc and/or alkali metal cations. The copolymer may be neutralized so that from about 10 to about 90%, preferably 30 to 90% of the available carboxylic acid groups in the copolymer are neutralized to salts with at least one metal ion selected from lithium, sodium, zinc, or combinations of such cations. For example, from about 10 to about 70 or about 30 to about 70% of the available carboxylic acid groups may be ionized by treatment with basic compound(s) (neutralization) with at least one metal ion selected from sodium, zinc, or lithium.

Non-limiting, illustrative examples of ethylene acid copolymers useful in ionomers include E/15MAA, E/19MAA, E/15AA, E/19AA, E/15MAA, E/19MAA, E/10MAA/4iBA, E/10MAA/9.8iBA, E/9MAA/23nBA, (wherein E represents ethylene, MAA represents methacrylic acid, AA represents acrylic acid, iBA represents isobutyl acrylate, nBA represents n-butyl acrylate, and the numbers represents the weight % of comonomers present in the copolymer).

Suitable zinc- or alkali metal-neutralized ethylene acid copolymers or terpolymers are sold under the trademark SURLYN® brand resins by E.I. DuPont de Nemours and Company (DuPont) of Wilmington, Del.

The mixed ion ionomer useful for blending with polyamides as described herein may be obtained by neutralizing an acid copolymer described above with a combination of a basic compound containing zinc cations and a basic compound containing alkali metal cations. Another method may be using an alkali metal ionomer or combination of alkali metal ionomers and neutralizing to a higher level with a basic compound containing zinc cations.

Alternatively, the mixed ion ionomer may be obtained by combining an ionomer containing zinc cations and an ionomer containing alkali metal cations. In such cases, the ethylene acid copolymer used as the base polymer in the zinc ionomer may be the same as, or different from, the ethylene acid copolymer used as the base polymer in the alkali metal ionomer. Also, the different ionomers may be melt-blended together with the polyamide, thereby forming the mixed ion ionomer and blending with the polyamide in a single step.

The composition or blend can comprise 0.0001, 0.01 or 0.1 or 1 weight % to about 1, 5, 10, 20, or 30 weight %, based on the weight of the entire composition including the polyamide/mixed ion ionomer blend, of optional additives including stabilizers, antioxidants, ultraviolet ray absorbers, hydrolytic stabilizers, anti-static agents, dyes or pigments, fire-retardants, processing aids such as lubricants, antiblock agents, release agents, or combinations of two or more thereof. Lubricants of note include salts of fatty acids such as zinc stearate, which may be added at about 0.1 to 1 weight % of the total composition.

The composition contains plasticizers which improve the flexibility of the polymer. According to embodiments of the present invention, plasticizers comprising poly(trimethylene ether) glycol and/or one or more esters (a monoester, a diester or mixtures thereof) of a polytrimethylene ether glycol are provided. In preferred embodiments, the plasticizers are prepared from renewably sourced ingredients.

The plasticizers are compositions comprising one or more compounds of the formula (I):

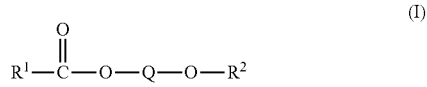

wherein Q represents the residue of a poly(trimethylene ether) glycol after abstraction of the hydroxyl groups, $R^2$ is H or $R^3CO$, and each of $R^1$, and $R^3$ is individually a substituted or unsubstituted aromatic, saturated aliphatic, unsaturated aliphatic, or cycloaliphatic organic group containing from 2 to 40 carbon atoms.

Poly(Trimethylene Ether) Glycol, Also Known as Poly1,3-Propanediol (PPD)

PPD for the purposes of the present disclosure is an oligomeric or polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

Poly(trimethylene ether) glycol is preferably prepared by polycondensation of monomers comprising 1,3-propanediol, thus resulting in polymers or copolymers containing —(CH$_2$CH$_2$CH$_2$O)— linkage (e.g, trimethylene ether repeating units). As indicated above, at least 50% of the repeating units are trimethylene ether units.

In addition to the trimethylene ether units, lesser amounts of other units, such as other polyalkylene ether repeating units, may be present. In the context of this disclosure, the term "poly(trimethylene ether) glycol" encompasses PO3G made from essentially pure 1,3-propanediol, as well as those oligomers and polymers (including those described below) containing up to about 50% by weight of comonomers.

The 1,3-propanediol employed for preparing the poly (trimethylene ether) glycol may be obtained by any of the various well known chemical routes or by biochemical transformation routes. Preferred routes are described in, for example, U.S. Pat. No. 7,919,658.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella, Citrobacter, Clostridium*, and *Lactobacillus*. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The PPD and esters based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions of the present invention can be characterized as more natural and having less environmental impact than similar compositions comprising petroleum based glycols.

The starting material for making PPD will depend on the desired PPD, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

The preferred poly(trimethylene ether) glycol for use in the invention has an Mn (number average molecular weight) of at least about 134, more preferably at least about 250, and still more preferably at least about 500. The Mn is preferably less than about 650. The preferred poly(trimethylene ether) glycol is water soluble or miscible.

Poly(trimethylene ether) glycols preferred for use herein are typically polydisperse having a polydispersity (i.e. Mw/Mn) of preferably from about 1.1 to about 2.2, more preferably from about 1.2 to about 2.2, and still more preferably from about 1.5 to about 2.1.

Poly(trimethylene ether) glycol esters are preferably prepared by polycondensation of hydroxyl groups-containing monomers (monomers containing 2 or more hydroxyl groups) predominantly comprising 1,3-propanediol to form a poly(trimethylene ether) glycol, followed by esterification with a monocarboxylic acid, as disclosed in U.S. Pat. No. 8,759,565 Preferred monocarboxylic acids used in esterification are: propionic acid, butyric acid, valeric acid, caproic acid, caprylic acid, pelargonic acid, capric acid, lauric acid, palmitic acid, oleic acid and stearic acid, benzoic acid, hydroxyl benzoic acid, and 2-ethyl-hexanoic acid. Most preferred monocarboxylic acid is benzoic acid. The ester compositions preferably comprise from about 50 to 100 wt %, more preferably from about 75 to 100 wt %, diester and from 0 to about 50 wt %, more preferably from 0 to about 25 wt %, monoester, based on the total weight of the esters.

Alternatively the poly(trimethylene ether) glycol esters can also be prepared by transesterfication of trimethylene ether glycol oligomers having a degree of polymerization from 2 to 8 with a monocarboxylic acid ester, as disclosed in U.S. Pat. No. 8,759,559. The preferred monocarboxylic acid ester is methylbenzoate.

The poly(trimethylene ether) glycol esters can be used as plasticizers for a variety of polymers, herein also referred to as "base polymers". Although any ester can be used, including copolyether esters, particularly preferred ones for the present disclosure include water-insoluble poly(trimethylene ether) glycol benzoate (PPDB). Other copolyether esters include hydroxybenzoate ester, phthalate ester, isophthalate ester, terephthlate ester, or trimellitate ester. Generally, the ester is added to the base polymer in an effective amount. As used herein, "effective amount" means the amount of plasticizer that provides improved physical properties to the base polymer (generally, increased flexibility, workability) so that the plasticized base polymer exhibits improved performance in the desired end use. Generally, the plasticizer is added to the base polymer in amounts of about 10 percent by weight or less, although it can be added in amounts up to about 40 percent by weight. For the purposes of the present invention, plasticizer can be included in any amount in the range of from 1 to 40 wt %. The preferred base polymers are aliphatic, aromatic, semi-aromatic polyamides or mixtures thereof.

Further, blended plasticizer compositions can be suitable for use herein, wherein blends of water insoluble polytrimethylene ether glycol benzoate (PPDB) with water soluble poly1,3-propylene diol (PPD) precursor can provide advantages when used with polyamides such as Nylon 6, for example. For example, PPDB in mixture with PPD can be used to plasticize the polymers of the present invention.

The poly(trimethylene ether) glycol esters can also be blended with other known plasticizers such as, for example, synthetic and natural esters. Natural esters include vegetable based triglyceride oils such as soybean, sunflower, rapeseed, palm, canola, and castor oils. Preferred vegetable oils include castor oil, high oleic soybean and high oleic sunflower oils.

The plasticizer can be added to the base polymer using any convenient method known to the skilled artisan. Generally, the plasticizer is mixed with the base polymer in a mixer and the temperature is elevated to between 200 and 300° C., although this temperature is dependent on the melt temperatures of base polymer and plasticizer used. Alternatively to melt processing, solvent or aqueous (wet) slurry processes can be used to add plasticizer to the polymer.

In some embodiments, the processing of the base polymer and plasticizer comprises melt processing at a temperature from 20 to 40° C. above the melt temperature of the base polymer.

Of note is a composition as described herein consisting of (1) a polyamide as described above or a blend of polyamide and an ionomer as described above; and (2) an aromatic ester of polytrimethylene ether glycol with or without polypropanediol After the base polymer and plasticizer are mixed (generally, 15 minutes to 60 minutes, but the time can vary depending upon the nature and properties of the materials mixed) the mixture is cooled. While any cooling method can be used, liquid nitrogen is generally used so that the plasticizer-base polymer mixture is cooled to a temperature where it can be ground.

Any grinding procedure can be used, and the material is generally ground to particle sizes of between about 0.1 and 10 mm, or any size that will allow further processing. Once the material is ground, then it is dried at a slightly elevated temperature (generally around 80° C.) under an inert atmosphere (generally nitrogen gas). The dried, ground material can then be further processed to form the desired product. The processing can take place in an extruder, or press mold, for example.

After the material has been processed, the composition is tested by a variety of methods, including tensile and tear strengths at given temperatures, burst strengths, flexural modulus, stress cracking, water absorption, burning characteristics, electrical properties, dielectric properties, surface characteristics (feel or "hand" and resistance to soiling and staining), and pliability at given temperatures (Durometer hardness and bending properties). Various test methods are commonly used, such as ASTM No. D638.

The blend may be produced by any means known to one skilled in the art, e.g., dry blending/mixing followed by melt blending such as by extrusion to produce the composition. The components of the blend may be melt blended in a single blending operation. Alternatively, the mixed ion ionomer may be prepared in a first step and then subsequently melt blended with the polyamide.

The composition may be formed into articles by various means known to those skilled in the art. For example, the composition may be extruded, laminated, molded (e.g. injection molded, blow molded or overmolded), cut, milled or the like to provide an article that is in a desired shape and size.

Articles comprising the thermoplastic composition also may be further processed. For example, portions of the composition (such as, but not limited to, pellets, slugs, rods, ropes, sheets and molded or extruded articles) may be subjected to thermoforming operations in which the composition is subjected to heat, pressure and/or other mechanical forces to produce shaped articles. Compression molding is an example of further processing. Sheets formed from these blends can be useful as photovoltaic (PV) backsheets due to reduced moisture absorption and low MVTR.

The composition can be used to fabricate vehicular parts, particularly those parts that are exposed to salt in normal vehicle operation. Such vehicular parts include cooling system components, intake manifolds, oil pans, transmission cases, electrical and electronic housings, fuel system components, filter housings, coolant pump covers, and radiator end tanks. A particularly useful part is fluid (liquid and/or gas) tubing or hose, used to transfer fluid from one portion of the vehicle to another. These ionmer-polyamide compositions have properties that make them especially useful for tubes and hoses, for example one or more of good resistance to heat, the various fluids found in vehicles especially fuel, hydraulic fluid, and cooling fluid, flexibility (especially when containing plasticizers) and good high pressure burst resistance. Air brake hoses are notable.

The compositions may be shaped by profile extrusion. A profile is defined by having a particular shape and by its process of manufacture is known as profile extrusion. An extruded profile is not film or sheeting, and thus the process for making profiles does not include the use of calendering or chill rolls, nor is it prepared by injection molding processes. A profile is fabricated by melt extrusion processes that begin by (co)extruding a thermoplastic melt through an orifice of a die (such as an annular die with a mandrel) forming an extrudate capable of maintaining a desired shape. The extrudate is typically drawn into its final dimensions while maintaining the desired shape and then quenched in air or a water bath to set the shape, thereby producing a profile. In the formation of simple profiles, the extrudate preferably maintains shape without any structural assistance. Common profile extruded articles include tubing or hoses. Monolayer or multilayer tubing may be prepared.

Tubing assemblies for the transport of liquids and vapors are well known in the art. Clarity of the tubing may be desirable for visual observation of the fluids being transferred, but is not essential in many instances. Furthermore, depending on the use of the tubing, there may be exposure to extremely low temperatures and/or extremely high temperatures. The compositions as described herein provide a good combination of metal halide resistance, toughness, flexibility, and in some cases clarity, making them suitable for preparation of profiles such as tubing.

The composition may be profile extruded to provide articles such as hoses for air conditioning; refrigeration; dispensing and transfer equipment for fluids including foods and beverages, compressed air or gases, paint, chemicals such as solvents, alkalis, dilute mineral or organic acids, petroleum products, fuels including oil and gas; coolant lines, grease lines, hydraulic lines, auto hoses or tubing, laboratory uses, instrumentation, air brake hoses, etc.

Flexible pipes or liners for oil or gas pipelines may also comprise the plasticized composition. In the operation of offshore oil or gas deposits it is necessary to use flexible pipes to connect the various devices around the platform. The pipes must withstand hot oil, gas, water and mixtures of at least two of these products for periods possibly as long as 20 years. Excellent salt stress crack resistance is also important for these applications. These pipes may consist of a non-impermeable metal inner layer formed by a profiled metal tape wound in a helix, such as an interlocked strip, which gives the pipe shape, a polymeric composition extruded over this layer in order to provide sealing and other protective and reinforcing layers, such as metal fiber plies and rubber plies.

An article of the present invention may be a multi-layered article, including articles wherein the polymeric composition may be adhered to a woven or nonwoven textile. The extruded profile comprises tubing, hose, pipe, etc.

U.S. Pat. No. 6,913,043, U.S. Patent Application Publications 2004/0058111, PCT Patent Application Publications WO2004/052993, WO2007/041722, and WO2007/041723 describe various pipe and tubing uses and constructions using prior polyamide compositions. The composition disclosed herein may be used as an alternative polyamide composition for use in those applications and constructions.

EXAMPLES

The following Examples are merely illustrative, and are not to be construed as limiting the scope of the invention.
Materials
Nylon-6, RV of 2.62 to 2.83, available under the tradename ULTRAMID® B27-E01 from BASF.
Nylon-12, available under the tradename Rilsan AESNO, extrusion grade nylon 12 from Arkema.
Nylon-66, nylon-610, nylon-612, nylon-610/6T and nylon-612/6T polyamides were from DuPont.
Zinc ionomer (Surlyn® 1706) and sodium ionomer (Surlyn® 1707) were from Du Pont. The ionomers employed were a Na ionomer and a Zn ionomer, both based on E/MAA (85/15 weight %) with about same melt flow index.
Zinc stearate: commercial grade.
Commercial Plasticizers:
NBBS: N-Butylbenzene sulfonamide plasticizer, available under the tradenames PLASTHALL® BSA from HallStar or UNIPLEX® 214 from Unitex Chemical Corp.
Polyethylene glycol dibenzoate (Mn 410) and poly(1,2-propylene glycol) dibenzoate (Mn 400) were from Aldrich.
Synthesis of Plasticizers:
Poly(trimethylene ether) glycol (PPD) having a number average molecular weight of 255 was prepared as described in U.S. Pat. No. 8,884,073.
The synthesis of poly(trimethylene ether) glycol benzoate (poly1,3-propanediol benzoate, PPDB) was carried out in two different routes as described below:

Examples 1a and 1b

Method A: Polycondensation of 1,3-propanediol Followed by Esterification with Benzoic Acid Biosourced 1,3-propanediol (Bio-PDO 4.08 kg, 53.6 moles, DuPont and Tate & Lyle Bioproducts) was charged into a 5 L flask fitted with a stirrer, a condenser and an inlet for nitrogen. The liquid in the flask was flushed with dry nitrogen for 1 h at room temperature. 33.2 g of concentrated sulfuric acid and 16.98 g of sodium carbonate solution having 1.74 g of sodium carbonate dissolved in 15.25 g of deionized water were added. The reaction mixture was heated to 166° C. while being stirred at 120 rpm for 8 hours. A total of 720 mL of distillate (water) was collected during the reaction. The reaction mixture was cooled, and 0.462 kg (3.8 moles) of benzoic acid was added to 0.5 Kg product obtained. The reaction temperature was then raised to 120° C. under nitrogen flow with continuous agitation at 180 rpm and maintained at that temperature for 7 hours. The reaction mixture was cooled, 0.5 kg of deionized water was added, and then the resulting mixture was heated at 95° C. for 2 hours. The reaction mixture was cooled to 60° C. and 270 g of 3.33 wt % sodium carbonate solution was added and the mixture was agitated at 60° C. for 30 min. The mixture was transferred to separating funnel and the aqueous layer was removed after separation. The product was again washed with 500 mL of deionized water. The obtained product was dried using rotary evaporator at about 85° C. and 200 mTorr pressure.

The dried product (Example 1a) was characterized by proton NMR. The product had a number average molecular weight (Mn) of 429 with a mixture of 78.5 wt % polytrimethylene ether diester and 21.5 wt % of polytrimethylene ether monoester and 17.8 wt % PDO ester.

Method B: Transesterfication of poly(trimethylene ether) glycol with methylbenzoate Poly(trimethylene ether) glycol (Mn 255, 0.761 kg, 2.98 moles), methylbenzoate (0.840 Kg, 6.17 moles) from Aldrich, sodium methoxide (8.0 g, 0.97 wt %) were charged into a 2 L flask fitted with a stirrer, a dean stark trap and an inlet for nitrogen. The reaction mixture in the flask was flushed with dry nitrogen for 0.5 h at room temperature and heated to 80° C. while being stirred. After 1 h, the reaction temperature was incrementally raised to 150° C. in 4 h and the reaction was allowed to proceed at 180° C. for 1.25 hours. A total of 88 mL of distillate was collected. Then the reaction mixture was cooled and filtered using Whatman™ #42 filter paper. The obtained product was mixed with 500 mL of deionized water and heated at 50° C. for 30 min. The mixture was transferred to a separating funnel and organic product was collected. Unreacted methylbenzoate in the product was removed by distilling at 180° C. and 200 mTorr pressure for 3h. The product was analyzed by proton NMR.

The product (Example 1b) was characterized by proton NMR. The product had a number average molecular weight ($M_n$) of 487 with a mixture of 91.9 wt % diester, 8.1 wt % monoester and 0.95 wt % of PDO ester.

The weight loss (volatility) of the two poly(trimethylene ether) glycol benzoates was determined using TGA by heating the samples to 250° C. and measuring the residual amount after 0 minutes, 2 minutes, 5 minutes and 30 minutes at this isothermal temperature. The weight losses of the benzoates were compared with commercial plasticizer n-butylbenzene sulfonamide (NBBS) in Table 1.

Extrusion/Processing Conditions

All polyamide samples with and without plasticizers were compounded using a 26 mm Coperion twin-screw extruder. Extruder barrel temperatures were controlled at 250° C. Polyamide 12 (Rilsan AESNO, extrusion grade nylon 12) or nylon 6 (Ultramid B27, extrusion grade nylon 6) were fed at barrel 5 followed by an intense mixing section in the extruder screw to melt the polymer, then by a vacuum vent at barrel 8 to remove any volatiles from the polymer melt. Extruder screw speed was controlled at 600 RPM, and the materials were extruded at 30 lb/hr (27.6 lb/hr pellets; 2.4 lb/hr plasticizer). Liquid plasticizers were pumped into the extruder at barrel 12 (of 13 barrels total extruder length) at 8% of the polymer feed rate using an Isco syringe pump. The extruder was not vented after plasticizer addition, in order to keep the plasticizer in the melt stream. The melt stream was extruded through a 3/16" die, the strand was quenched in a water bath, and the cooled strand was cut into pellet form.

Polyamide/ionomer alloys with and without plasticizers were also compounded on a 26 mm twin screw extruder using barrel temperature settings of ~260° C., extruder screw speed 600 RPM. Nylon-6 (59.5%, Ultramid B27), zinc ionomer (30% Surlyn® 1706), sodium ionomer (10% Surlyn® 1707) and zinc stearate (0.5%) were added to the extruder at barrel 5, followed by an intense mixing section in the extruder screw There was a vacuum vent at barrel 8 to remove any volatiles created during the melt mixing process. Liquid plasticizer (7.4%) was added at barrel 12, again followed by an intense mixing section in the screw.

Material was discharged from the extruder through a 3/16" die. The melt strand was quenched in water, and cut into pellets.

Pellets from the extrusion compounding step were dried in a desiccant drying oven at 80° C. for about 16 hours and then molded into ASTM flex bars (5"×0.5"×0.125") on an Arburg 221K 38 ton 1.5 oz injection molding machine. Molding machine barrel temperature settings were controlled at about 270° C., and the mold temperature was approximately 25° C. Mold cycle times and injection pressure were adjusted to accommodate the melt viscosity of the various samples.

Methods Employed for Testing

Flexural (flex) modulus of ASTM flex bars that were injection molded was measured using test method ASTM D790-10 "Standard Test Methods for Flexural Properties of Unreinforced and Reinforced Plastics and Electrical Insulating Materials", procedure A. Span was 2", crosshead speed 0.05"/min, and maximum strain was 2%. Nylon samples with no plasticizer were used as control samples with each set of experimental samples that were tested. The results are shown in Table 2-5 below. Where the results state "could not be injection molded", the plasticizer had apparently migrated to the surface of the pellets to the point that the material slipped on the feed screw and could not be fed into the molding cavity.

Melt viscosity was measured at 250° C. using a Kayeness melt rheometer of a 0.04 inch×0.8 inch 20/1 L/D orifice. A six minute holdup/melt time in the rheometer barrel was used before measurements were taken. Melt viscosity was measured at shear rates of 3003, 1194, 893, 186, 35 and 12 $sec^{-1}$. Only data at 35 $sec^{-1}$ are reported herein for comparison.

Storage modulus and loss modulus of plasticized polyamides were measured on a Q800 DMA (Dynamic Mechanical Analysis) from TA Instruments. The measurements were performed in dual cantilever (flex) mode from −140° C. to +125° C., at heating rate of 2° C./min. The storage modulus values at −40° C., 25° C. and 100° C. and the glass transition temperatures ($T_g$) from loss modulus and tan delta peaks were reported in Table 6.

The environmental stress cracking test was measured according to ASTM D1693. The purpose of this test is to measure the chemical resistance of a compound by artificially stimulating a stress introduced into a sample by means of a stress crack or "nick." Ten specimens of each composition sample were used. The size of the test specimen was 1.5 inch long×0.5 inch wide×0.125 inch thick. The test specimens were nicked, then placed into a holder so that they were held in a bent configuration with the nicked side facing up. The specimens were then immersed in 50 weight % aqueous zinc chloride solution at room temperature (RT), about 20 to about 25° C. The specimens were inspected periodically for formation of cracks which indicated failure of the specimen. At the end of 168 hours (7 days), the test was ended and the total number of failures out of the ten specimens tested was recorded. When no samples failed during that time, the test results were reported as being greater than 7 days in Tables 2-5.

For the water absorption experiments, we first dried injection molded ASTM flex bars of nylon-6 without (Comparative Example 1), with NBBS (Comparative Example 2) and with poly(trimethylene ether) glycol benzoate (Example 4) samples in a vacuum oven at 85° C. for 4 days to make sure the samples started at approximately equal moisture content. We then weighed the dried samples (3 flex bars for each sample) to determine the starting weight. Samples were immersed in distilled water at ambient temperature. At 1 day, 7 day and 49 day time intervals, we removed the samples from the water, dried surface water from the samples with paper towels, and again weighed the samples to determine percent weight change due to water absorption. The averages of the three values are reported in Table 7.

The long chain polyamides such as nylon-11 and nylon-12 melt at lower temperatures (175-186° C.) than short chain polyamides such as nylon-6 and nylon-66 (215-265° C.), as a result the short chain polyamides must be processed at higher temperatures. Therefore, the volatility and stability of a plasticizer are important factors at the processing temperatures of short chain polyamides.

TABLE 1

TGA weight loss of plasticizers at isothermal temperature of 250° C.

| Example | Plasticizer | Diester wt % | % Residual weight at 250° C. | | | |
|---|---|---|---|---|---|---|
| | | | 0 min | 2 min | 5 min | 30 min |
| Comp Example 1 | NBBS | — | 0.82 | 0.30 | 0.19 | 0.17 |
| Example 1a | PPDB | 78.5 | 79.2 | 72.6 | 65.0 | 36.0 |
| Example 1b | PPDB | 91.9 | 93.8 | 90.1 | 84.7 | 54.5 |

As data in Table 1 shows that the poly(trimethylene ether) glycol benzoate is less volatile than NBBS, and the volatility of the PPDB decreased further by increasing the degree of esterification. As a result of lower volatility, the PPDB is preferred plasticizer for polyamides and in particular to high melting polyamides such as nylon-6 and nylon-66.

Table 2 and 3 summarize the properties of nylon-6 and nylon-12.

TABLE 2

Properties nylon-6

| Example | Plasticizer | Flex modulus (MPa) | Melt Viscosity (250° C. at 35 $sec^{-1}$ shear rate) (Pa sec) | $ZnCl_2$ Resistance |
|---|---|---|---|---|
| Comp Ex 2 | None | 2516 | 321 | 5 min |
| Comp Ex 2a | 8% NBBS | 1172 | 184 | 30 min |
| Example 2 | 8% PPD | 1131 | 39.5 | 5 min |

TABLE 3

Properties of nylon-12

| Example | Plasticizer | Flex modulus (MPa) | Melt Viscosity (250° C. at 35 $sec^{-1}$ shear rate) (Pa sec) | $ZnCl_2$ Resistance |
|---|---|---|---|---|
| Comp Ex 3 | None | 1427 | 2111 | >7 days |
| Comp Ex 3a | 8% NBBS | 510 | 1186 | >7 days |
| Example 3 | 8% PPD | 558 | 494 | >7 days |

As shown in Table 2, all of the three nylon-6 samples with and without plasticizers cracked in exposing to $ZnCl_2$ at room temperature within 5-30 minutes, where as all of the nylon-12 samples (Table 3) showed resistant to $ZnCl_2$ more than 7 days suggest there is no adverse effect of the plasticizers on polyamides with respect to their salt resistance. As expected with no added plasticizer, nylon-12

(Comparative Example 3), with a higher ratio of methylene groups to amide (NHC=O), had higher flexibility than nylon-6 with a lower ratio of methylene groups to amide (Comparative Example 2). Though the flexural modulus of both nylon-12 and nylon-6 was significantly improved in the presence of NBBS plasticizer at 8 wt % level (Comparative Examples 2a and 3a), the NBBS is being used as a plasticizer for long chain polyamides over short chain polyamides for use in automotive applications where salt resistance is highly desirable. The Examples 2 & 3 of the present invention in Table 2 & 3 demonstrated the effectiveness of 100% bio based, water soluble, non-toxic, biodegradable and low molecular weight poly(trimethylene ether) glycol as a sustainable plasticizer in reducing the flexural modulus of both nylon-6 and nylon-12 polymers, and the effectiveness is similar to the water insoluble, petroleum sourced n-butyl benzene sulfonamide plasticizer.

TABLE 4

Properties of plasticized nylon-6

| Example | Plasticizer | Flex modulus (MPa) | Melt Viscosity (250° C. at 35 sec$^{-1}$ shear rate) (Pa sec) | ZnCl$_2$ Resistance |
| --- | --- | --- | --- | --- |
| Example 4 | 8% PPDB | 1475 | 41 | >7 days |
| Comp Ex 4 | 8% Polyethylene glycol dibenzoate | 1724 | 26 | 5 min |
| Comp Ex 5 | 8% Poly(1,2-propylene glycol) dibenzoate | 2282 | 178 | Not tested |

TABLE 5

Properties of plasticized nylon-12

| Example | Plasticizer | Flex modulus (MPa) | Melt Viscosity (250° C. at 35 sec$^{-1}$ shear rate) (Pa sec) | ZnCl$_2$ Resistance |
| --- | --- | --- | --- | --- |
| Example 5 | 8% PPDB | 765 | 840 | >7 days |
| Comp Ex 6 | 8% Polyethylene glycol dibenzoate | 738 | 26 | >7 days |
| Comp Ex 7 | 8% Poly(1,2-propylene glycol) dibenzoate | Could not injection molded | 178 | Not tested |

In contrast to PPD, the PPDB is water insoluble, more rigid molecule due to the presence of benzene ring and higher molecular weight. In spite of different structure and properties, the PPDB is also effective plasticizer for both nylon-6 and nylon-12 and improved the flexibility (Examples 4&5). Furthermore, the nylon-6 comprising PPDB plasticizer (1a) exhibited excellent salt resistance as opposed to NBBS and PPD. Compared to Comparative Examples 4-7, the Examples 4 & 5 showed the unique behavior of the PPDB plasticizer over the commercially available dibenzoates though they all belong to the same family: The polyethylene glycol dibenzoate is lower homologue of poly (trimethylene ether) glycol benzoate where as the poly(1,2-propylene glycol) dibenzoate is an isomer of poly(trimethylene ether) glycol benzoate.

TABLE 6

Dynamical Mechanical Analysis Data

| Polyamide | Plasticizer | Storage modulus (MPa) | | | Tg (° C.) | |
| --- | --- | --- | --- | --- | --- | --- |
| | | −40° C. | 25° C. | 100° C. | Loss modulus | tan δ |
| Nylon-6 | none | 2263 | 1684 | 332 | 32.7 | 50.7 |
| | 8% NBBS | 2638 | 814 | 236 | 9.7 | 22.1 |
| | 8% PPD | 2867 | 738 | 264 | 2.8 | 14.9 |
| | 8% PPDB | 2031 | 975 | 214 | 18.6 | 41.9 |
| Nylon-12 | none | 1621 | 1306 | 175 | 42.9 | 48.4 |
| | 8% NBBS | 1852 | 510 | 128 | 5.1 | 19.6 |
| | 8% PPD | 1719 | 561 | 143 | 7.9 | 26.3 |
| | 8% PPDB | 1689 | 752 | 142 | 22.8 | 40.1 |

Surprisingly though, the polyamides comprising of poly (trimethylene ether) glycol benzoate had highest glass transition temperatures, Tg, compared to NBBS and PPD but exhibited lowest storage modulus at −40° C. demonstrating their superior low temperature flexibility—a highly desirable property for automotive applications (Table 6). It is interesting to observe that the storage modulus of PPDB plasticized nylon-6 at −40° C. is very close to NBBS plasticized nylon-12 indicating that the high cost nylon-12 could be replaceable with low cost nylon-6.

Though the compositions were not optimized, the properties of the plasticized polyamides can be improved further by tailoring the composition of PPDB by varying the mole ratio of diester to monoester, the chain length and the amount.

One of the major drawbacks of nylon-6 over nylon-12 is its high water absorption that can result in poor dimensional stability of the shaped articles derived from it. In general the higher the amount of water absorption the poorer is the dimensional stability. The 7 or 49 day result in Table 7 shows that the PPDB plasticized nylon-6 absorbed water significantly lower (by more than 65% by weight) than that of unplasticized nylon-6. The NBBS plasticized nylon-6 absorbed more water compared to PPDB plasticized nylon-6.

TABLE 7

Water absorption of nylon-6 with and without plasticizers

| Example | Plasticizer | Water absorption (%) | | |
| --- | --- | --- | --- | --- |
| | | 1 day | 7 day | 49 day |
| Comp Ex 2 | None | 2.72 | 5.52 | 11.23 |
| Comp Ex 2a | 8% NBBS | 1.61 | 3.45 | 6.93 |
| Example 4 | 8% PPDB | 0.80 | 1.88 | 4.47 |

Table 8 shows the flex modulus results on other nylon polymers with and without plasticizers.

TABLE 8

The flexural modulus of polyamides

| Example | Polyamide | Plasticizer | Flex modulus (MPa) |
| --- | --- | --- | --- |
| Comp Ex 8 | Nylon 66 | none | 2709 |
| Comp Ex 8a | | 8% NBBS | 1958 |
| Example 6 | | 8% PPD | 1875 |
| Example 6a | | 8% PPDB | 2254 |
| Example 6b | | 4% PPD + 4% PPDB | 2583 |

TABLE 8-continued

The flexural modulus of polyamides

| Example | Polyamide | Plasticizer | Flex modulus (MPa) |
|---|---|---|---|
| Comp Ex 9 | Nylon 612 | none | 1802 |
| Comp Ex 9a | | 8% NBBS | 1434 |
| Example 7 | | 8% PPD | 1082 |
| Example 7a | | 8% PPDB | 1321 |
| Example 7b | | 4% PPD + 4% PPDB | 1680 |
| Comp Ex 10 | Nylon 610 | none | 1815 |
| Comp Ex 10a | | 8% NBBS | 827 |
| Example 8 | | 8% PPD | 744 |
| Example 8a | | 8% PPDB | 1135 |
| Example 8b | | 4% PPD + 4% PPDB | 827 |
| Comp Ex 11 | Nylon 610/6T | none | 1751 |
| Comp Ex 11a | | 8% NBBS | 572(deformed) |
| Example 9 | | 8% PPD | 903 |
| Example 9a | | 8% PPDB | 880 |
| Example 9b | | 4% PPD + 4% PPDB | 209 |
| Comp Ex 12 | Nylon 612/6T | none | 1673 |
| Comp Ex 12a | | 8% NBBS | 482(deformed) |
| Example 10 | | 8% PPD | 820 |
| Example 10a | | 8% PPDB | 827 |
| Example 10b | | 4% PPD + 4% PPDB | 382 |

The data in Table 8 are somewhat surprising: (a) the two semi-aromatic polyamides (nylon-610/6T and nylon-612/6T) plasticized with NBBS, under the same conditions used for other plasticizers, were deformed, (b) both water soluble PPD and water insoluble PPDB were effective plasticizers for both aliphatic and semi-aromatic polyamides, (c) the 50/50 blend of PPD/PPDB had synergistic effect on semi-aromatic polyamides that would allow use of much lower amounts of plasticizer blend, (d) in contrast, the same blend had negligible effect on nylon-66 and nylon-612.

In Table 9, the water vapor transmission rates (VWTR) measured on the films, prepared by compression molded at 250° C., at 100% RH (relative humidity) and 38° C. are reported. Excellent barrier to moisture was observed for PPDB plasticized nylon-6 composition and the permeation rate of this film was very close to that of plasticized nylon-12.

TABLE 9

WVTR of Polyamide films

| Example | Polymer Composition | Thickness mils | Transmission rate gm/[m²-day] | Permeation rate Gm-mil/[m²-day] |
|---|---|---|---|---|
| Comp Ex 13 | 100% Nylon-6 | 8.3 | 55.22 | 458.22 |
| Comp Ex 13a | 92% Nylon-6 8% NBBS | 7.65 | 55.66 | 425.32 |
| Example 11 | 92% Nylon-6 8% PPDB | 9.65 | 12.17 | 117.47 |
| Comp Ex 14 | 92% Nylon-12 8% NBBS | 8.35 | 10.79 | 90.11 |

Table 10 shows the flex modulus and salt resistance results of nylon-6/Surlyn® blend with and without plasticizers.

TABLE 10

Properties of nylon-6/surlyn® blend

| Example | Polymer | Plasticizer | Flex modulus (MPa) | ZnCl₂ resistance |
|---|---|---|---|---|
| Comp Ex 15 | 100% Nylon-6 | None | 2516 | 5 min |
| Comp Ex 16 | 59.5% Nylon 6 | None | 1337 | >7 days |
| Comp Ex 16a | 30% Surlyn® | 8% NBBS | 648 | 1 h |
| Example 12 | 1706 | 8% PPD | 724 | 1 h |
| Example 12a | 10% Surlyn® 1707 0.5% Zn stearate | 8% PPDB (91.9 wt % diester) | 1172 | >7 days |

As seen before, the ionomers when blended with nylon-6, the blended polymer not only had high flexibility but resistant to ZnCl₂ salt. However the NBBS plasticizer when added to this blend showed adverse effect on salt resistance and thus makes the composition unsuitable to applications where salt resistance is desired. On the other hand, the same blend in the presence of PPDB plasticizer showed excellent salt resistance.

As shown in Table 11 shows the flex modulus nylon-6/Surlyn® blend can be altered by varying the weight ratio of PPD and PPDB in the blend.

TABLE 11

Flexural modulus of nylon-6/Surlyn® blend

| Example | Polyamide composition | Plasticizer | Flex modulus (MPa) |
|---|---|---|---|
| Comp Ex 17 | 59.5% Nylon 6 | None | 1605 |
| Example 13 | 30% Surlyn® 1706 | 8% 75/25 PPD/PPDB | 747 |
| Example 13a | 10% Surlyn® 1707 0.5% Zn stearate | 8% 50/50 PPD/PPDB | 923 |

What is claimed is:

1. A flexible polymer composition comprising a polyamide base polymer, an ethylene acid copolymer or a salt thereof, and plasticizer, wherein the plasticizer comprises an effective amount of poly(trimethylene ether) glycol (PPD), wherein the polyamide base polymer is an aliphatic polyamide, a semi-aromatic polyamide, or a mixture thereof.

2. The flexible polymer composition of claim 1, wherein the PPD is present in an amount of from about 1 to about 15% by weight based on the total weight of the base polymer.

3. The flexible polymer composition of claim 1, wherein the polyamide base polymer comprises nylon 6, nylon 66, nylon 610, nylon 1010, nylon 612, nylon 11, nylon 12, or mixtures thereof.

4. The flexible polymer composition of claim 1, wherein the plasticizer is present in an amount of from about 1 to about 10 wt %.

5. The flexible polymer composition of claim 1, further comprising one or more additional natural or synthetic ester plasticizers.

6. The flexible polymer composition of claim 1 comprising Nylon 6 in an amount of at least about 50 wt %, wherein the composition has a flex modulus of less than about 1500 MPa, wherein the flex modulus is measured by ASTM D790-10 test method.

7. The composition of claim 1 comprising Nylon 12 in an amount of at least about 50 wt % and wherein the composition has a flex modulus of less than than 1000 MPa.

8. The composition of claim 1 wherein the PPD has a number average molecular weight (Mn) below 500.

9. The composition of claim 5 wherein the additional plasticizer is the benzoate ester of PPD.

10. An article comprising the polymer composition of claim 1.

11. The article of claim 10, wherein the effective amount of plasticizer is from 1 to 15% by weight based on the total weight of the base polymer.

12. The article of claim 10, wherein the aliphatic polyimide base polymer comprises nylon 6, nylon 66, nylon 610, nylon 1010, nylon 612, nylon 11, nylon 12, or mixtures thereof.

* * * * *